United States Patent [19]

Edwards

[11] Patent Number: 5,134,210
[45] Date of Patent: * Jul. 28, 1992

[54] ACRYLIC RESIN COMPOSITION

[76] Inventor: Bill R. Edwards, 809 E. Jackson, Broken Arrow, Okla. 74012

[*] Notice: The portion of the term of this patent subsequent to Jul. 31, 2007 has been disclaimed.

[21] Appl. No.: 720,009

[22] Filed: Jun. 24, 1991

Related U.S. Application Data

[60] Continuation-in-part of Ser. No. 568,194, Aug. 15, 1990, Pat. No. 5,045,613, which is a continuation-in-part of Ser. No. 528,728, May 23, 1990, Pat. No. 5,023,313, which is a division of Ser. No. 386,501, Jul. 27, 1989, Pat. No. 4,945,122.

[51] Int. Cl.$^5$ ............................................. C08F 4/00
[52] U.S. Cl. .................................. 526/209; 526/213; 526/224; 526/314; 526/332
[58] Field of Search ............... 526/209, 213, 224, 314, 526/332

[56] References Cited

U.S. PATENT DOCUMENTS

| | | | |
|---|---|---|---|
| Re. 31,165 | 3/1983 | Serini et al. | 525/67 |
| 2,445,536 | 7/1948 | Parsons et al. | 526/314 |
| 2,964,501 | 12/1960 | Sarofeen | 526/314 |
| 3,250,813 | 5/1966 | Stephenson | 526/332 |
| 3,268,484 | 8/1966 | Costanza et al. | 526/332 |
| 3,487,062 | 12/1969 | Bodycot | 260/89.5 |
| 3,847,865 | 11/1974 | Duggins | 260/42.52 |
| 3,957,921 | 5/1976 | Iwahashi | 525/205 |
| 4,113,803 | 9/1978 | Price | 260/885 |
| 4,152,506 | 5/1979 | Novak | 526/206 |
| 4,159,301 | 6/1979 | Buser et al. | 264/331 |
| 4,214,064 | 7/1980 | Kanazawa | 525/309 |
| 4,260,564 | 4/1981 | Baiocchi et al. | 526/314 |
| 4,319,003 | 3/1982 | Garlund | 525/148 |
| 4,528,351 | 7/1985 | Tarumi et al. | 526/314 |
| 4,588,798 | 5/1986 | Heitner | 526/228 |
| 4,743,654 | 5/1988 | Kyu et al. | 525/148 |
| 4,745,029 | 5/1988 | Kambour | 428/412 |
| 4,791,184 | 12/1988 | Nagai et al. | 525/305 |

FOREIGN PATENT DOCUMENTS

| | | | |
|---|---|---|---|
| 192683 | 4/1989 | Japan | 526/314 |
| 1103947 | 2/1968 | United Kingdom | 526/332 |

*Primary Examiner*—Joseph L. Schofer
*Assistant Examiner*—N. Sarofim
*Attorney, Agent, or Firm*—Bill D. McCarthy; Glen M. Burdick

[57] ABSTRACT

An acrylic resin is provided which has excellent weatherability, outstanding transparency and improved heat and solvent resistance, as well as improved impact strength. The acrylic resin comprises an intimate blend of a polymerization syrup and a catalytic amount of a polymerization catalyst capable of effecting polymerization of the syrup. The polymerization syrup, which has an improved shelf life and can be stored at ambient temperature and atmospheric pressure, consists essentially of:

(a) from about 300 to about 1000 parts per volume of an acrylic monomer represented by the formula $$CH_2=\underset{\underset{\displaystyle CH_3}{|}}{C}-COOR$$

wherein R is an alkyl moiety containing 1 to about 18 carbon atoms;
(b) from about 0.1 to about 1000 parts by volume of a non-peroxide oxygen donator;
(c) from about 0.1 to about 5 parts by volume of mercaptan; and
(d) from about 0.3 to about 40 parts by volume of a crosslinking agent compatible with the acrylic monomer.

The polymerization syrup can further contain from about 1 to about 100 parts by volume of a polycarbonate compound.

24 Claims, No Drawings

ACRYLIC RESIN COMPOSITION

CROSS REFERENCE TO RELATED APPLICATIONS

The subject application is a continuation-in-part of copending application U.S. Ser. No. 07/568,194 filed Aug. 15, 1990, now U.S. Pat. No. 5,045,613, which is a continuation-in-part of U.S. Ser. No. 07/528,728 filed May 23, 1990, now U.S. Pat. No. 5,023,313 which is a divisional application of U.S. Ser. No. 07/386,501 filed Jul. 27, 1989, now U.S. Pat. No. 4,945,122.

BACKGROUND OF THE INVENTION

1. Field of the Invention

The present invention relates to acrylic resin compositions, and more particularly, but not by way of limitation, to an acrylic monomer based polymerization syrup having an improved shelf life. In one aspect the present invention relates to an acrylic monomer containing polymerization syrup which, upon addition of a quaternary ammonium salt polymerization catalyst, is curable at ambient temperatures and pressure.

2. Brief Description of Prior Art

Acrylic resins formed predominantly of methyl methacrylate have heretofore been known. Because acrylic resins formed of methyl methacrylate are linear polymers, the polymers have exhibited good weatherability and transparency. However, such polymers have suffered from disadvantages in that they are deficient in resistance to heat, solvents, shock, and surface hardness. Because of these deficiencies the prior art is replete with acrylic based resin compositions wherein the base polymer, i.e. methyl methacrylate, is copolymerized with other polymers in an effort to overcome the before-stated deficiencies of such resins Examples of several plastic resin compositions, and methods for producing such compositions which have heretofore been employed to overcome the inherent deficiencies of the acrylic resin compositions wherein methyl methacrylate is employed as the base monomer are U.S. Pat. No. 4,791,184, issued Dec. 13, 1988 to Nagai et al.; U.S. Pat. No. 4,319,003, issued Mar. 9, 1982 to Gardlund; U.S. Pat. No. 4,214,064, issued Jul. 22, 1980 to Kanazawa; U.S. Pat. No. 4,152,506, issued May 1, 1979 to Novak; and U.S. Pat. No. 3,957,921, issued May 18, 1976 to Iwahashi et al.

While various methods and resin compositions have been proposed for improving the resistance to heat, solvents, shock and surface hardness of acrylic based resins (without sacrificing the desired properties of weatherability and transparency of such resins), the resulting modified polymers have a tendency to become colored on heating and the desired properties of weatherability, transparency and color are often sacrificed or reduced Thus, it would be desirable if one could develop a polymerization syrup of an acrylic monomer which would maintain all of the desired properties of an acrylic resin, while at the same time overcome the known deficiencies of an acrylic resin. Further, it would also be desirable if one could formulate an acrylic resin composition which maintains its desired properties when cast into thick sheets or articles, which would be substantially void or bubble free, and which is curable at ambient temperature and pressure. It is to such a polymerization syrup and resin composition that the present invention is directed.

SUMMARY OF THE INVENTION

In accordance with the present invention an acrylic resin is provided which has excellent weatherability, outstanding transparency and improved heat and solvent resistance, as well as improved impact strength. The acrylic resin comprises an intimate blend of a polymerization syrup and a catalytic amount of a polymerization catalyst capable of effecting polymerization of the syrup. The polymerization syrup consists essentially of:

(a) from about 300 to about 1000 parts per volume of an
acrylic monomer represented by the formula

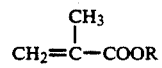

wherein R is an alkyl moiety containing 1 to about 18 carbon atoms;

(b) from about 0.1 to about 1000 parts by volume of a non-peroxide oxygen donator such as 2,2-bis(allyloxymethyl)-butan-1-ol or diallylphthalate;

(c) from about 0.1 to about 5 parts by volume of a mercaptan; and (d) from about 0.3 to about 40 parts by volume of a crosslinking agent compatible with the acrylic monomer.

The acrylic monomer containing polymerization syrup described above, in addition to having an improved shelf life, can also be stored at ambient temperatures and pressure without deterioration of the syrup. That is, the polymerization syrup of the present invention can be stored and transported without the need of refrigeration. However, the shelf life of the polymerization syrup has been enhanced by the addition of from about 1 to about 100 parts by volume of a polycarbonate compound such as allyl diglycol carbonate.

The acrylic resins of the present invention exhibit improved clarity and hardness, and the pour to pull time (i.e., cure rate) of such acrylic resins can be substantially reduced by exposing the resins to radiation generated by visible light or ultraviolet light. Further, it has now been discovered that the clarity, hardness and cure rate of the acrylic resin of the present invention can be further enhanced by incorporation of a minor effective amount of a hydroxyalkyl methacrylate compatible with the acrylic monomer present in the polymerization syrup. The hydroxyalkyl methacrylate can be incorporated into the polymerization syrup during formulation of the syrup, or the hydroxyalkyl methacrylate can be introduced into the syrup during the addition of the polymerization catalyst.

An object of the present invention is to provide a novel acrylic resin and a method for the production thereof Another object of the present invention, while achieving the before stated object, is to provide an acrylic resin excelling in physical properties, such as heat and solvent resistance without sacrificing the desired properties of transparency and weatherability Yet another object of the present invention, while achieving the before stated objects, is to provide a polymerization syrup for an acrylic resin which, when admixed with an effective amount of a polymerization catalyst, permits the resulting resin composition to be cured at ambient temperatures and pressure.

Still another object of the present invention, while achieving the before stated objects, is to provide a polymerization syrup for an acrylic resin having improved shelf life.

Other objects, advantages and features of the present invention will become apparent upon reading of the following detailed description in conjunction with the appended claims.

DETAILED DESCRIPTION

The present invention provides a polymerization syrup having an improved shelf life which, when admixed with a catalytic amount of a polymerization catalyst capable of effecting polymerization of the syrup, provides an acrylic resin composition which is curable at ambient temperatures and pressure. The polymerization syrup consists essentially of:

(a) from about 300 to about 1000 parts by volume of an acrylic monomer represented by the formula $$CH_2=\underset{\underset{CH_3}{|}}{C}-COOR$$

wherein R is an alkyl moiety containing 1 to about 18 carbon atoms;

b) from about 0.1 to about 1000 parts by volume of a non-peroxide oxygen donator, such as 2,2-bis(allyloxymethyl)-butan-1-ol or diallylphthalate;

(c) from about 0.1 to about 5 parts by volume of a mercaptan; and (d) from about 0.3 to about 40 parts by volume of a crosslinking agent compatible with the acrylic monomer.

In formulating the polymerization syrup of the present invention, any suitable acrylic monomer represented by the formula $$CH_2=\underset{\underset{CH_3}{|}}{C}-COOR$$

wherein R is an alkyl moiety containing 1 to about 18 carbon atoms, more desirably from 1 to 8 carbon atoms, can be employed provided that the acrylic monomer is a liquid at ambient temperature. Examples of alkyl moieties satisfying the definition for R of the before-described formula include methyl, ethyl, propyl, butyl, pentyl, hexyl, heptyl, octyl, nonyl, decyl, undecyl, dodecyl, tetradecyl, pentadecyl, nexadecyl, heptadecyl, octadecyl and the like. Specific examples of an acrylic monomer satisfying the above defined formula include methyl methacrylate, ethyl methacrylate, n-butyl methacrylate, 2-ethylhexyl methacrylate, cyclohexyl methacrylate, ω-hydroxyalkyl methacrylate, and the like.

The mercaptan employed in the formulation of the polymerization syrup is represented by the general formula:

RSH wherein R contains from 1 to about 22 carbon atoms. Further, R can be any suitable moiety, such as an alkyl moiety, a cycloaliphatic moiety and the like. Illustrative of such mercaptans are methyl mercaptan, propyl mercaptan, n-octyl mercaptan, n-dodecyl mercaptan, dilimonen dimercaptan, cyclohexyl dimercaptan, ethylcyclohexyl dimercaptan and mixed primary tridecyl mercaptan.

It should be noted that the only requirement for the mercaptan is that the mercaptan be in liquid form under the conditions of mixing, and that the mercaptan be compatible with the particular acrylic monomer employed in the formulation of the polymerization syrup, as well as with the non-peroxide oxygen donator, such as 2,2-bis(allyloxymethyl)-butan-1-ol or diallylphthalate and the crosslinking agent employed in the formulation.

In order to produce an acrylic resin which can be cured at ambient temperatures and pressure the polymerization syrup (in addition to the acrylic monomer, the non-peroxide oxygen donator and the mercaptan) further includes a crosslinking agent. The amount of crosslinking agent employed can vary widely and will be determined to a large degree by the efficiency of the crosslinking agent when admixed with a polymerization catalyst. That is, for a strong crosslinking agent such as ethylene glycol dimethacrylate, the concentration of the crosslinking agent required will be slightly more. However, it has generally been found that when formulating a polymerization syrup of the present invention that the amount of crosslinking agent, although same can vary widely, will generally be from about 0.3 to about 40 parts by volume of the crosslinking agent. Typical crosslinking agents which may be employed in the formulation of the polymerization syrup, in addition to ethylene glycol dimethacrylate, include allyl methacrylate, allyl acrylate, ethylene glycol diacrylate, polyethylene glycol dimethacrylate, diethylene glycol dimethacrylate, triethylene glycol dimethacrylate, and mixtures thereof.

As previously indicated, the amount of crosslinking agent incorporated into the polymerization syrup can vary widely, depending to a large degree on the particular crosslinking agent employed. However, desirable results can generally be obtained when the crosslinking agent is incorporated into the syrup in an amount sufficient to provide from about 0.3 to about 40 parts by volume of the crosslinking agent.

To stabilize the polymerization syrup and thus enhance the shelf life of the syrup, the polymerization syrup may further include an effective amount of a polycarbonate compound. The amount of polycarbonate compound incorporated into the polymerization syrup can vary widely but will generally be in an amount to provide from about 1 to about 100 parts by volume of the polycarbonate compound in the syrup.

Any suitable polycarbonate compound which is compatible with the acrylic monomer can be employed in the formulation of the polymerization syrup. However, desirable results have been obtained wherein the polycarbonate compound is allyl diglycol carbonate.

It should be noted that in formulating a polymerization syrup as set forth above, one does not need to incorporate polymerization inhibitors into the syrup in order to prevent undesired or premature polymerization. That is, it has been unexpectedly found that the shelf life of the polymerization syrup can be improved to a desirable level, without the need of refrigeration, when the syrup is formulated as set forth above; and that the shelf life can be further enhanced by incorporation of from about 1 part to about 100 parts by volume of the polycarbonate compound per volume of the syrup, and more desirably from about 25 to about 50 parts by volume of the polycarbonate compound.

To enhance mold release it is often desirable to incorporate into the polymerization syrup an effective minor amount of an internal mold release agent. The amount of the internal mold release agent can vary widely, but will generally be in an amount sufficient to provide the syrup with from about 0.01 to about 2 parts per volume of the internal mold release agent.

Any suitable internal mold release agent can be employed in the formulation of the polymerization syrup provided that the mold release agent is compatible with the other ingredients constituting the syrup. For example, desirable results have been obtained wherein the internal mold release agent is a surfactant, and wherein the surfactant is an anionic or nonionic surfactant which is compatible with the acrylic monomer and which does not reduce the transparency of the resulting polymeric resin. Examples of suitable anionic surfactant include:

sodium alkyl sulfate, such as sodium octylsulfate, sodium laurylsulfate, sodium stearylsulfate;

sodium alkylbenzenesulfates, such as sodium dodecylbenzenesulfate;

sodium alkylsulfonates, such as sodium cetylsulfonate and sodium stearlylsulfonate;

sodium dialkyl sulfosuccinates, such as sodium dioctyl sulfosuccinate, and the like.

Examples of nonionic surfactants include:

polyethyleneglycol alkyl ethers, such as polyethyleneglycol glycol oleyl ether, polyethyleneglycol lauryl ether, and the like;

polyethyleneglycol alkylphenyl ethers, such as polyethyleneglycol nonylphenyl ether;

higher fatty acid esters of polyethyleneglycol, such as oleic acid ester of polyethyleneglycol, stearic acid ester of polyethyleneglycol, lauric acid ester of polyethyleneglycol, and the like;

polyethyleneglycol polypropyleneglycol ether;

sorbitan fatty acid esters, such as sorbitan monolaurate, sorbitan monostearate, and the like;

polyethyleneglycol sorbitan fatty acid esters, such as polyethyleneglycol sorbitan monolauric acid ester, polyethyleneglycol sorbitan monooleic acid ester, phosphoric acid esters of polyethyleneglycol; and phosphoric acid esters of alkylpolyethyleneglycol and the like.

The surfactants listed above are merely illustrative of anionic and nonionic surfactants which can be employed as the internal mold release agent in the formulation of the polymerization syrup of the present invention. However, desirable results have been obtained wherein the surfactant is sodium dioctyl sulfosuccinate.

A polymerization syrup formulated as set forth above, whether same incorporates the polycarbonate compound and/or the mold release agent, can be catalyzed by a catalytic amount of quaternary ammonium salts generally known as "fabric softeners". The acrylic resin formulated from the polymerization syrup and the quaternary ammonium salt catalyst provides a resin molding material which can be cured at ambient temperatures and atmospheric pressure to produce articles having the desired properties of an acrylic resin, that is, the desired properties of transparency and weatherability, while improving the impact strength and the heat and solvent resistance of the resin composition. Further, it should be noted that when employing the resin composition, articles can be molded having a thickness of up to four inches or greater which do not require post curing treatment, and are substantially void or bubble free. Thus, it becomes apparent that the unique polymerization syrup and the resin which results from admixing a catalytic amount of the quaternary ammonium salt polymerization catalyst with the syrup represents an advance in the state of the art of acrylic resins.

As previously stated, the quaternary ammonium salts employed as the catalyst for the polymerization syrup of the present invention are generally known in the industry as "fabric softeners". Illustrative examples of such quaternary ammonium salts are as follows:

Dialkyldimethylammonium chlorides, such as dicocodimethylammonium chloride and ditallow dimethylammonium chloride;

Dialkyldimethylammonium methylsulfates;

Alkyltrimethylammonium chlorides, such as soya trimethylammonium chloride, hydrogenated tallow trimethylammonium chloride, palmityltrimethylammonium chloride, cocotrimethylammonium chloride, tallow trimethylammonium chloride, and benzyltrimethylammonium chloride; and Alkyldimethylbenzylammonium chlorides, such as dimethylalkyl ($C_{14}$–$C_{18}$) benzylammonium chloride and dimethylalkyl ($C_{12}$–$C_{16}$) benzylammonium chloride.

It should be noted that the above examples are merely illustrative of the quaternary ammonium salts which can be used in the formulation of the additive for polyester resinous compositions having improved curing and color clarity properties. Further, of such quaternary ammonium salts it is believed that the most desirable of such salts for use in the formulation of the additive of the present invention are dicocodimethylammonium chloride, benzyltrimethylammonium chloride, trimethyldodecylammonium chloride dimethylalkyl ($C_{12}$–$C_{16}$) benzylammonium chloride and dimethylstearylbenzylammonium chloride.

The amount of the quaternary ammonium salt employed to catalyze the polymerization syrup can vary widely and will be dependent to a large degree upon the acrylic monomer employed in the formulation of the polymerization syrup, as well as the quaternary ammonium salt chosen as the catalyst. However, generally, the amount of the quaternary ammonium salt employed to catalyze the polymerization syrup will be an amount sufficient to provide from about 0.1 to about 15 parts by volume of the catalyst, based on the total volume of the monomer present in the polymerization syrup.

Preparation of Polymerization Syrup

In the preparation of the polymerization syrup of the present invention, an acrylic monomer satisfying the formula heretofore described is selected. While any suitable acrylic monomer satisfying the definition of the acrylic monomer set forth hereinbefore can be employed, especially desirable results have been obtained wherein the acrylic monomer is methyl methacrylate.

The acrylic monomer is transferred to a mixing vessel and effective minor amounts of a non-peroxide oxygen donator, such as 2,2-bis(allyloxymethyl)-butan-1-ol or diallylphthalate, a mercaptan and a crosslinking agent compatible with the acrylic monomer are admixed with the acrylic monomer to form an intimate blend containing from about 300 to 1000 parts by volume of the acrylic monomer, from about 0.1 to about 1000 parts by volume of the 2,2-bis(allyloxymethyl)-butan-1-ol or the diallylphthalate from about 0.1 to about 5 parts by volume of the mercaptan, and from about 0.3 to about 40 parts by volume of the crosslinking agent.

When the intimate blend of the four described ingredients has been formulated, the blend is heated to a temperature of from about 80 degrees Centigrade to about 110 degrees Centigrade for a period of time effective to provide the blend with a desired viscosity. That is, the intimate blend is heated at the specified temperature for a period of time so that the viscosity of the syrup can be controlled depending upon the end use for which the polymerization syrup is to be employed.

While the polymerization syrup prepared in accordance with the procedures above has exhibited improved shelf life, that is, the syrup has demonstrated a storability of at least six weeks at ambient temperatures without any detectable changes as to its viscosity or deterioration, the shelf life of the polymerization syrup can be further enhanced by incorporating into the intimate blend, prior to heating, from about 1 to about 100 parts by volume of a polycarbonate compound compatible with the acrylic monomer. While any polycarbonate resin compatible with the acrylic monomer can be employed, desirable results have been obtained when the polycarbonate compound is allyl diglycol carbonate.

To enhance the removal of articles from a mold (when such articles are fabricated of a polymeric resin consisting essentially of the polymerization syrup as heretofore described and a catalytic amount of a quaternary ammonium salt), an effective minor amount of the internal mold release agent can be incorporated into the intimate blend.

As previously stated the effective amount of the internal mold release agent employed can vary widely but will generally be from about 0.2 to about 2 parts by volume of the release agent per total volume of the syrup. Further, the internal release agent can be any suitable surfactant which is compatible with the acrylic monomer.

In addition to the internal mold release agent, other additives which do not interfere with the quality or characteristics of the polymerization syrup can be incorporated into the syrup. Typical of such other additives are coloring agents, ultraviolet absorbers, glass fibers or any other appropriate additive which may be desired dependent on the end use of the polymerization syrup.

As mentioned above, the polymerization syrup of the present invention has a remarkably improved shelf life, and the syrup does not need to be stored in refrigerated conditions to maintain the integrity of the syrup. In addition, the acrylic compositions formulated of the polymerization syrup and a catalytic amount of a quaternary ammonium salt exhibit improved thermal stability without deterioration of the excellent weathering resistance, transparency and color of the resin composition.

The unique characteristics of the acrylic resin permit one to cast the resin in four inches or greater thickness, while at the same time providing a resin composition which can be cured at ambient temperatures and atmospheric pressure, and which does not require any post curing treatment. That is, the unique acrylic resin composition of the present invention allows one to substantially reduce the pour to pull time and does not require heat or vacuum in order to cure the resin. Under normal circumstances when employing the acrylic resin of the present invention, the pour to pull time of articles, even those having a thickness of up to about four inches, is less than about 8 hours.

Should one desire to shorten the pour to pull time of the acrylic resins of the present invention, such can readily be achieved by initially heating the mold for a relatively short period of time. The temperature to which the mold is heated to enhance curing of the acrylic resin (as well as the period of time the mold is heated) can vary, but generally one can enhance the curing of the acrylic resin by heating the mold to a temperature of from about 40 degrees Centigrade to 65 degrees Centigrade for a period of up to about 30 minutes without altering the properties of the acrylic resin.

It has also been found that the pour to pull time of the acrylic resins of the present invention can be reduced substantially (i.e., the pour to pull time can be reduced up to about 30 percent) by exposing the acrylic resins to radiation generated by either a visible light source or an ultraviolet light source.

While the acrylic resins of the present invention have exhibited improved pour to pull times, and articles molded using the acrylic resins of the present invention have exhibited improved clarity and hardness properties, it has now been found that incorporation of a minor effective amount of a hydroxyalkyl methacrylate compound into the acrylic resins further enhances the pour to pull time of the acrylic resins as well as the clarity and hardness of articles molded from such resinous compositions.

The amount of the hydroxyalkyl methacrylate incorporated into the acrylic resin can vary widely but will generally be an amount sufficient to provide the acrylic resin with from about 0.25 to 100 parts by volume of the hydroxyalkyl methacrylate, and more desirably, from about 1 to about 40 parts by volume. Further, the hydroxyalkyl methacrylate can be incorporated into the polymerization syrup without adversely effecting the shelf life of the syrup, or the hydroxyalkyl methacrylate can be introduced into the syrup when the catalyst is admixed with the polymerization syrup.

Any suitable hydroxyalkyl methacrylate which is compatible with the acrylic monomer used in the formulation of the polymerization syrup can be employed. Typical of such hydroxyalkyl methacrylates which can be incorporated into the acrylic resins of the present invention are hydroxymethyl methacrylate, hydroxyethyl methacrylate, hydroxypropyl methacrylate, hydroxybutyl methacrylate and the like.

In order to further illustrate the present invention the following examples are given. However, it is to be understood that the examples are for illustrative purposes only and are not to be construed as limiting the scope of the subject invention.

EXAMPLE I

Polymerization syrup was prepared by admixing the following ingredients to form an intimate blend:
500 ml of methyl methacrylate monomer
0.9 ml of 2,2-bis(allyloxymethyl)-butan-1-ol
1.5 ml of n-octyl mercaptan
40 ml ethylene glycol dimethacrylate
The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup), the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected, thus illustrating that the syrup containing the methyl methacrylate monomer, 2,2-bis(allyloxymethyl)-butan-1-ol, n-octyl mercaptan and ethylene glycol dimethacrylate had a useful shelf life at ambient temperatures and atmospheric pressure of about three months.

EXAMPLE II

Polymerization syrup was formulated in accordance with the procedure of Example I with the exception that 30 ml of a polycarbonate compound (i.e. allyl diglycol carbonate) was incorporated into the blend prior to heating. The polymerization syrup containing a polycarbonate compound was cooled, placed in a glass container, sealed and stored at ambient temperature and atmospheric pressure. Examinations of the syrup were conducted to determine the integrity of the syrup during the storage period. It was observed that after a nine month storage period no deterioration of the syrup could be detected. That is, the viscosity of the syrup was substantially unchanged, and no polymerization of the monomer could be detected. Thus, the experiments substantiated that by incorporating a minor effective amount of a polycarbonate compound into the polymerization syrup of the present invention, a syrup is provided which has an unexpected, substantially improved shelf life, and that the syrup can be stored at ambient temperature and atmospheric pressure. That is, the new and unique polymerization syrups of the present invention have an improved shelf life and do not require refrigeration in order to maintain the integrity of the polymerization syrup.

EXAMPLE III 1 ml of benzyltrimethylammonium chloride (a quaternary ammonium salt catalyst) was admixed with 100 ml of the syrup prepared using the procedure of Example I. The resulting resin was poured into molds of various configurations and having thicknesses of from about 1 inch to about 3 inches. The resin was then allowed to cure at ambient temperature and atmospheric pressure. The curing time for the resin varied depending upon the thickness of the mold cavity. That is, a mold employed to fabricate a slab of material having a thickness of about 1 inch cured in about 2 hours; whereas the mold employed to fabricate the article having a thickness of about 3 inches cured in about 8 hours. At the end of the curing period the resulting molded articles were removed from the mold. The articles had a tendency to adhere to the surfaces of the mold, thus requiring more effort to remove the articles from the mold.

EXAMPLE IV

A polymeric resin was formulated utilizing the procedure of Example III except the syrup was formulated using the procedure of Example II and the syrup contained about 1.5 parts by volume of sodium dioctyl sulfosuccinate, and an anionic surfactant which functioned as an internal mold release agent. The same molding conditions were carried out as Example III, and after curing the articles were readily removable from the mold without any adherence to the surface of the mold.

EXAMPLE V

A polymeric resin was formulated utilizing the procedure of Example III except the syrup was formulated using the procedure of Example I and the syrup contained about 1.5 parts by volume of sodium dioctyl sulfosuccinate, and an anionic surfactant which functioned as an internal mold release agent. The same molding conditions were carried out as Example III, and after curing the articles were readily removable from the mold without any adherence to the surface of the mold.

The articles molded employing the catalyzed polymerization syrups and procedures set forth above exhibited excellent clarity and improved resistance to solvent and heat. Further, the articles were extremely durable and had an improved impact strength when compared to articles fabricated using conventional acrylic resins.

EXAMPLE VI

Polymerization syrup was prepared by admixing the following ingredients to form an intimate blend:
500 ml of methyl methacrylate monomer
0.9 ml of diallylphthalate
1.5 ml of n-octyl mercaptan
40 ml ethylene glycol dimethacrylate
The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup) the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected, thus illustrating that the syrup containing the methyl methacrylate monomer, diallylphthalate, n-octyl mercaptan and ethylene glycol dimethacrylate had a useful shelf life at ambient temperatures and atmospheric pressure of about three months.

EXAMPLE VII

Polymerization syrup was formulated in accordance with the procedure of Example I with the exception that 30 ml of a polycarbonate compound (i.e. allyl diglycol carbonate) was incorporated into the blend prior to heating. The polymerization syrup containing a polycarbonate compound was cooled, placed in a glass container, sealed and stored at ambient temperature and atmospheric pressure. Examinations of the syrup were conducted to determine the integrity of the syrup during the storage period. It was observed that after a nine month storage period no deterioration of the syrup could be detected, that is, the viscosity of the syrup was substantially unchanged, and no polymerization of the monomer could be detected. Thus, the experiments substantiated that by incorporating a minor effective amount of a polycarbonate compound into the polymerization syrup of the present invention that a syrup is provided which has an unexpected, substantially improved shelf life, and that the syrup can be stored at ambient temperature and atmospheric pressure. That is, the new and unique polymerization syrups of the present invention have an improved shelf life and do not require refrigeration in order to maintain the integrity of the polymerization syrup.

EXAMPLE VIII 1 ml of benzyltrimethylammonium chloride (a quaternary ammonium salt catalyst) was admixed with 100 ml of the syrup prepared using the procedure of Example I. The resulting resin was poured into molds of various configurations and having thicknesses of from about 1 inch to about 3 inches. The resin was then allowed to cure at ambient temperature and atmospheric pressure or at ambient temperature and atmospheric pressure in the presence of ultraviolet light or visible light. The curing time for the resin varied depending upon the thickness of mold cavity, that is, a mold employed to fabricate a slab of material having a thickness of about 1 inch cured in about 2 hours; whereas the mold employed to fabricate the article having a thickness of about 3 inches cured in about 8 hours. At the end of the curing period the resulting molded articles were removed from the mold. The articles had a tendency to adhere to the surfaces of the mold, thus requiring more effort to remove the articles from the mold.

EXAMPLE IX

A polymeric resin was formulated utilizing the procedure of Example III except the syrup was formulated using the procedure of Example VII and the syrup contained about 1.5 parts by volume of sodium dioctyl sulfosuccinate, and an anionic surfactant which functioned as an internal mold release agent. The same molding conditions were carried out as Example VIII, and after curing the articles were readily removable from the mold without any adherence to the surface of the mold.

EXAMPLE X

A polymeric resin was formulated utilizing the procedure of Example VIII except the syrup was formulated using the procedure of Example VI and the syrup contained about 1.5 parts by volume of sodium dioctyl sulfosuccinate, and an anionic surfactant which functioned as an internal mold release agent. The same molding conditions were carried out as Example VIII, and after curing the articles were readily removable from the mold without any adherence to the surface of the mold.

The articles molded employing the catalyzed polymerization syrups and procedures set forth above exhibited excellent clarity and improved resistance to solvent and heat. Further, the articles were extremely durable and had an improved impact strength when compared to articles fabricated using conventional acrylic resin.

EXAMPLE XI

Polymerization syrup was prepared by admixing the following ingredients to form an intimate blend:
3000 ml of methyl methacrylate monomer
5.4 ml of 2,2-bis(allyloxymethyl)-butan-1-ol
9 ml of n-octyl mercaptan
240 ml ethylene glycol dimethacrylate
15 ml hydroxyethyl methacrylate The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup) the polymerization syrup was allowed to cool and placed in a glass container.

1 ml of benzyltrimethylammonium chloride (a quaternary ammonium salt catalyst) was admixed with 100 ml of the polymerization syrup. The resulting resin was poured into molds of various configurations and having thicknesses of from about 1 inch to about 3 inches. The resin was then cured at ambient temperature and atmospheric pressure in the presence of visible light or ultraviolet light. The curing time for the resin varied depending upon the thickness of mold cavity. However, it was noted that the cure rate was improved (that is, the pour to pull time of the articles was less than the cure time for articles produced from resins which did not contain the hydroxyethyl methacrylate) and the resulting articles exhibit improved clarity and hardness.

EXAMPLE XII

Polymerization syrup was formulated in accordance with the procedure of Example XI with the exception that 180 ml of a polycarbonate compound (i.e. allyl diglycol carbonate) was incorporated into the blend prior to heating. The polymerization syrup containing a polycarbonate compound was cooled and placed in a glass container.

1 ml of benzyltrimethylammonium chloride (a quaternary ammonium salt catalyst) was admixed with 100 ml of the polymerization syrup. The resulting resin was poured into molds of various configurations and having thicknesses of from about 1 inch to about 3 inches. The resin was then cured at ambient temperature and atmospheric pressure in the presence of visible light or ultraviolet light. The curing time for the resin varied depending upon the thickness of mold cavity. However, it was noted that the cure rate was improved (that is, the pour to pull time of the articles was less than the cure time for articles produced from resins which did not contain the hydroxyethyl methacrylate) and the resulting articles exhibit improved clarity and hardness.

EXAMPLE XIII

Polymerization syrup was prepared by admixing the following ingredients to form an intimate blend:
3000 ml of methyl methacrylate monomer
540 ml of 2,2-bis(allyloxymethyl)-butan-1-ol
9 ml of n-octyl mercaptan
240 ml ethylene glycol dimethacrylate The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup), the polymerization syrup was allowed to cool, placed in a glass container, and the container was sealed.

EXAMPLE XIV 1 ml of benzyltrimethylammonium chloride (a quaternary ammonium salt catalyst) was admixed with 100 ml of the syrup prepared using the procedure of Example XIII. The resulting resin was poured into molds of various configurations. The resin was then allowed to cure at ambient temperature and atmospheric pressure. The curing time for the resin varied between 2 and 3 hours, depending upon the thickness of the mold cavity.

EXAMPLE XV

Polymerization syrup was prepared by admixing the following ingredients to form an intimate blend:
3000 ml of methyl methacrylate monomer
120 ml of 2,2-bis(allyloxymethyl)-butan-1-ol
6 ml of n-octyl mercaptan
15 ml ethylene glycol dimethacrylate
The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup), the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected , thus illustrating that the syrup had a useful shelf life at ambient temperatures and atmospheric pressure of about three months.

EXAMPLE XVI 1 ml of benzyltrimethylammonium chloride (a quaternary ammonium salt catalyst) was admixed with 100 ml of the syrup prepared using the procedure of Example XV. The resulting resin was poured into molds of various configurations. The resin was then allowed to cure at ambient temperature and atmospheric pressure. The curing time for the resin varied between 2 and 3 hours, depending upon the thickness of the mold cavity.

EXAMPLE XVII

Polymerization syrup was prepared by admixing the following ingredients to form an intimate blend:
3000 ml of methyl methacrylate monomer
400 ml of 2,2-bis(allyloxymethyl)-butan-1-ol
3 ml of n-octyl mercaptan
30 ml ethylene glycol dimethacrylate
The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity When the desired viscosity had been achieved (such viscosity depending solely upon the end use for the acrylic resin to be formulated from the polymerization syrup), the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected, thus illustrating that the syrup had a useful shelf life at ambient temperatures and atmospheric pressure of about three months.

EXAMPLE XVIII 1 ml of benzyltrimethylammonium chloride (a quaternary ammonium salt catalyst) was admixed with 100 ml of the syrup prepared using the procedure of Example XVII. The resulting resin was poured into molds of various configurations. The resin was then allowed to cure at ambient temperature and atmospheric pressure. The curing time for the resin varied between 2 and 3 hours, depending upon the thickness of the mold cavity.

EXAMPLE XIX

Polymerization syrup was prepared by admixing the following ingredients to form an intimate blend:
3000 ml of methyl methacrylate monomer
80 ml of 2,2-bis(allyloxymethyl)-butan-1-ol
1.5 ml of n-octyl mercaptan
15 ml ethylene glycol dimethacrylate
The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup), the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected, thus illustrating that the syrup had a useful shelf life at ambient temperatures and atmospheric pressure of about three months.

EXAMPLE XX 1 ml of benzyltrimethylammonium chloride (a quaternary ammonium salt catalyst) was admixed with 100 ml of the syrup prepared using the procedure of Example XIX. The resulting resin was poured into molds of various configurations. The resin was then allowed to cure at ambient temperature and atmospheric pressure.

The curing time for the resin varied between 2 and 3 hours, depending upon the thickness of the mold cavity.

It is clear that the present invention is well adapted to carry out the objects and attain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A polymerization syrup having an improved shelf life, the polymerization syrup consisting essentially of:

from about 300 to about 1000 parts by volume of an acrylic monomer represented by the formula $$CH_2=\underset{\underset{CH_3}{|}}{C}-COOR$$

wherein R is an alkyl moiety containing 1 to about 18 carbon atoms;

from about 0.1 to about 1000 parts by volume of a non-peroxide oxygen donator, 2,2 bis(allyloxymethyl)-butane-1-ol or diallylphthalate;

from about 0.5 about 5 parts by volume of a mercaptan; and from about 0.3 to about 40 parts by volume of a crosslinking agent compatible with the acrylic monomer.

2. The polymerization syrup of claim 1 wherein the syrup further includes from about 1 to about 100 parts by volume of a polycarbonate compound compatible with the acrylic monomer.

3. The polymerization syrup of claim 2 wherein the polycarbonate compound is allyl diglycol carbonate.

4. The polymerization syrup of claim 1 wherein the mercaptan is represented by the formula

RSH wherein R is an alkyl moiety containing from 1 to about 22 carbon atoms.

5. The polymerization syrup of claim 4 wherein the acrylic monomer is methyl methylacrylate.

6. The polymerization syrup of claim 5 wherein the mercaptan is n-octyl mercaptan and the crosslinking agent is ethylene glycol dimethacrylate.

7. The polymerization syrup of claim 1 which further includes a minor effective amount of an internal mold release agent compatible with the acrylic monomer.

8. The polymerization syrup of claim 7 wherein the minor effective amount of the internal mold release agent is an amount sufficient to provide from about 0.01 to about 2 parts by volume of the internal mold release agent in the polymerization syrup.

9. The polymerization syrup of claim 8 wherein the internal mold release agent is selected from the group consisting of anionic and nonionic surfactants.

10. An acrylic resin curable at ambient temperature and pressure which comprises an intimate blend of a polymerization syrup and a catalytic amount of a polymerization catalyst capable of effecting polymerization of the syrup, the polymerization syrup consisting essentially of:

from about 300 to about 1000 parts by volume of an acrylic monomer represented by the formula $$CH_2=\underset{\underset{CH_3}{|}}{C}-COOR$$

wherein R is an alkyl moiety containing 1 to about 8 carbon atoms;

from about 0.1 to about 1000 parts by volume of a non-peroxide oxygen donator 2,2-bis(allyloxymethyl)-butan-1-ol or diallylphthalate;

from about 0.5 to about 5 parts by volume of a mercaptan; and from about 0.3 to about 40 parts by volume of a crosslinking agent compatible with the acrylic monomer.

11. The acrylic resin of claim 10 wherein the polymerization syrup further includes from about 1 to about 100 parts by volume of a polycarbonate compound compatible with acrylic monomer.

12. The acrylic resin of claim 11 wherein the polycarbonate compound is allyl diglycol carbonate.

13. The acrylic resin of claim 11 wherein the polymerization syrup further includes a minor effective amount of an internal mold release agent compatible with the acrylic monomer.

14. The acrylic resin of claim 13 wherein the minor effective amount of the internal mold release agent is an amount of from about 0.01 to about 2 parts per volume, based on the volume of the syrup.

15. The acrylic resin of claim 10 wherein the polymerization syrup further includes a minor effective amount of an internal mold release agent compatible with the acrylic monomer.

16. The acrylic resin of claim 15 wherein the minor effective amount of the internal mold release agent is an amount of from about 0.01 to about 2 parts per volume, based on the volume of the syrup.

17. The acrylic resin of claim 10 wherein the catalytic amount of the catalyst for effecting polymerization of the polymerization syrup is from about 0.1 to about 15 parts by volume, based on the volume of monomer present in the polymerization syrup.

18. The acrylic resin of claim 17 wherein the polymerization catalyst is a quaternary ammonium salt.

19. The acrylic resin of claim 18 wherein the quaternary ammonium salt is selected from the group consisting of dicocodimethylammonium chloride, dimethylalkyl ($C_{12}$–$C_{16}$) benzylammonium chloride and dimethylstearylbenzylammonium chloride.

20. The acrylic resin of claim 17 wherein the mercaptan is represented by the formula

RSH wherein R is an alkyl moiety containing 1 to about 22 carbon atoms.

21. The acrylic resin of claim 20 wherein the acrylic monomer is methyl methacrylate.

22. The acrylic resin of claim 21 wherein the mercaptan is n-octyl mercaptan and the crosslinking agent is ethylene glycol dimethacrylate.

23. The acrylic resin of claim 22 wherein the polymerization syrup further includes from about 0.01 to about 2 parts by volume of an internal mold release agent selected from the group consisting of an anionic surfactant and a nonionic surfactant.

24. The acrylic resin of claim 23 wherein the internal mold release agent is sodium dioctyl sulfosuccinate.

* * * * *

UNITED STATES PATENT AND TRADEMARK OFFICE
CERTIFICATE OF CORRECTION

PATENT NO. : 5,134,210
DATED : July 28, 1992
INVENTOR(S) : Bill R. Edwards

It is certified that error appears in the above-identified patent and that said Letters Patent is hereby corrected as shown below:

Column 1, line 37, between the words "resins" and "Example" insert a period --.-- .

Column 2, line 59, after the word "thereof" insert a period --.-- .

Column 5, line 28, delete "glycol".

Signed and Sealed this

Eighth Day of February, 1994

Attest:

BRUCE LEHMAN

Attesting Officer     Commissioner of Patents and Trademarks